(12) United States Patent
Grushkevich et al.

(10) Patent No.: US 8,073,388 B2
(45) Date of Patent: Dec. 6, 2011

(54) METHOD AND SYSTEM FOR DYNAMICALLY CHANGING POLL TIMING BASED ON BLUETOOTH ACTIVITY

(75) Inventors: Asif Grushkevich, LaJolla, CA (US); Murali Kadiyala, Escondido, CA (US)

(73) Assignee: Broadcom Corporation, Irvine, CA (US)

( * ) Notice: Subject to any disclaimer, the term of this patent is extended or adjusted under 35 U.S.C. 154(b) by 680 days.

(21) Appl. No.: 11/745,680

(22) Filed: May 8, 2007

(65) Prior Publication Data

US 2008/0207126 A1    Aug. 28, 2008

Related U.S. Application Data (60) Provisional application No. 60/891,967, filed on Feb. 28, 2007.

(51) Int. Cl.
*H04B 7/00* (2006.01)
*H04L 12/403* (2006.01)

(52) U.S. Cl. .................. 455/41.2; 370/449; 370/458

(58) Field of Classification Search ............... 455/556.2, 455/507, 41.2; 370/346, 468, 338, 444, 318, 370/445, 390, 449, 458
See application file for complete search history.

(56) References Cited

U.S. PATENT DOCUMENTS

| | | | |
|---|---|---|---|
| 6,657,987 B1 * | 12/2003 | Kumar et al. | 370/346 |
| 6,980,542 B2 * | 12/2005 | Benveniste | 370/346 |
| 7,706,399 B2 * | 4/2010 | Janczak | 370/449 |
| 2002/0003812 A1 * | 1/2002 | Haartsen | 370/474 |
| 2002/0167961 A1 * | 11/2002 | Haartsen | 370/444 |
| 2003/0081603 A1 * | 5/2003 | Rune | 370/390 |
| 2005/0002372 A1 * | 1/2005 | Rune et al. | 370/346 |
| 2005/0018706 A1 * | 1/2005 | Myojo | 370/445 |
| 2006/0256765 A1 * | 11/2006 | Shih et al. | 370/346 |
| 2008/0192935 A1 * | 8/2008 | Saito et al. | 380/270 |

* cited by examiner

*Primary Examiner* — Temesgh Ghebretinsae
*Assistant Examiner* — Gennadiy Tsvey
(74) *Attorney, Agent, or Firm* — Thomas, Kayden, Horstemeyer & Risley, LLP (57) ABSTRACT

Methods and systems for dynamically changing poll timing based on Bluetooth activity are disclosed. Aspects of one method may include determining synchronous Bluetooth activity between a Bluetooth master device and at least one Bluetooth slave device. The synchronous Bluetooth activity may comprise, for example, transmission of packets by the Bluetooth master device via a SCO link and/or a eSCO link. The Bluetooth master device may dynamically adjust a polling period based on the synchronous Bluetooth activity. For example, the polling period may be less when there is synchronous activity than when there is no synchronous activity. The polling periods for when there is synchronous activity and when there is no synchronous activity may be default values. The default polling periods may be changed to different values, for example, by the user.

21 Claims, 7 Drawing Sheets

METHOD AND SYSTEM FOR DYNAMICALLY CHANGING POLL TIMING BASED ON BLUETOOTH ACTIVITY

CROSS-REFERENCE TO RELATED APPLICATIONS/INCORPORATION BY REFERENCE

This application makes reference to, claims priority to, and claims benefit of U.S. Provisional Application Ser. No. 60/891,967 entitled "METHOD AND SYSTEM FOR DYNAMICALLY CHANGING POLL TIMING BASED ON BLUETOOTH ACTIVITY" and filed Feb. 28, 2007.

The above stated application is hereby incorporated herein by reference in its entirety.

MICROFICHE/COPYRIGHT REFERENCE

Not Applicable

FIELD OF THE INVENTION

Certain embodiments of the invention relate to wireless communication. More specifically, certain embodiments of the invention relate to a method and system for dynamically changing poll timing based on Bluetooth activity.

BACKGROUND OF THE INVENTION

The use of Wireless Personal Area Networks (WPANs) has been gaining popularity in a great number of applications because of the flexibility and convenience in connectivity they provide. WPAN systems, such as those based on Class 2 Bluetooth (BT) technology, generally replace cumbersome cabling and/or wiring used to connect peripheral devices and/or mobile terminals by providing short distance wireless links that allow connectivity within a 10-meter range. Though, for a limited number of applications, higher-powered Class 1 BT devices may operate within a 100-meter range, for example. In contrast to Class 2 WPAN systems, Wireless Local Area Networks (WLANs) provide connectivity to devices that are located within a slightly larger geographical area, such as the area covered by a building or a campus, for example. WLAN systems are based on IEEE 802.11 standard specifications, typically operate within a 100-meter range, and are generally utilized to supplement the communication capacity provided by traditional wired Local Area Networks (LANs) installed in the same geographic area as the WLAN system.

In some instances, WLAN systems may be operated in conjunction with WPAN systems to provide users with an enhanced overall functionality. For example, Bluetooth technology may be utilized to connect a laptop computer or a handheld wireless terminal to a peripheral device, such as a keyboard, mouse, headphone, and/or printer, while the laptop computer or the handheld wireless terminal is also connected to a campus-wide WLAN network through an access point (AP) located within the building.

Both Bluetooth and WLAN radio devices, such as those used in, for example, handheld wireless terminals, generally operate in the 2.4 GHz (2.4000-2.4835 GHz) Industrial, Scientific, and Medical (ISM) unlicensed band. Other radio devices, such as those used in cordless phones, may also operate in the ISM unlicensed band. While the ISM band provides a suitable low-cost solution for many of short-range wireless applications, it may also have some drawbacks when multiple users operate simultaneously. For example, because of the limited bandwidth, spectrum sharing may be necessary to accommodate multiple users. Multiple active users may also result in significant interference between operating devices. Moreover, in some instances, microwave ovens may also operate in this frequency spectrum and may produce significant interference or blocking signals that may affect Bluetooth and/or WLAN transmissions.

When operating a Bluetooth radio and a WLAN radio in, for example, a wireless device, at least two different types of interference effects may occur. First, when an interfering signal is present in a transmission medium along with the signal-of-interest, a low signal-to-noise-plus-interference ratio (SINR) may result. In this instance, for example, a Bluetooth signal may interfere with a WLAN signal or a WLAN signal may interfere with a Bluetooth signal. The second effect may occur when the Bluetooth and WLAN radio devices are collocated, that is, when they are located in close proximity to each other so that there is a small radio frequency (RF) path loss between their corresponding radio front-end receivers. In this instance, the isolation between the Bluetooth radio front-end and the WLAN radio front-end may be as low as 10 dB, for example. As a result, one radio may desensitize the front-end of the other radio upon transmission. Moreover, since Bluetooth employs transmit power control, the collocated Bluetooth radio may step up its power level when the signal-to-noise ratio (SNR) on the Bluetooth link is low, effectively compromising the front-end isolation between radio devices even further. Low noise amplifiers (LNAs) in the radio front-ends may not be preceded by a channel selection filter and may be easily saturated by the signals in the ISM band, such as those from collocated transmissions. The saturation may result in a reduction in sensitivity or desensitization of the receiver portion of a radio front-end, which may reduce the radio front-end's ability to detect and demodulate the desired signal.

Packet communication in WLAN systems requires acknowledgement from the receiver in order for the communication to proceed. When the isolation between collocated radio devices is low, collisions between WLAN communication and Bluetooth communication, due to greater levels of mutual interference than if the isolation were high, may result in a slowdown of the WLAN communication, as the access point does not acknowledge packets. This condition may continue to spiral downwards until the access point drops the WLAN station. If, in order to avoid this condition, WLAN communication in collocated radio devices is given priority over all Bluetooth communication, then isochronous Bluetooth packet traffic, which does not have retransmission capabilities, may be starved of communication bandwidth. Moreover, this approach may also starve other Bluetooth packet traffic of any communication access. Collocated WLAN/Bluetooth radio devices should therefore be operated so as to maintain WLAN communication rates high while also providing access to Bluetooth communication when necessary.

Different techniques have been developed to address the low isolation problem that occurs between collocated Bluetooth and WLAN radio devices in coexistent operation. These techniques may take advantage of either frequency and/or time orthogonality mechanisms to reduce interference between collocated radio devices. Moreover, these techniques may result from so-called collaborative or non-collaborative mechanisms in Bluetooth and WLAN radio devices, where collaboration refers to any direct communication between the protocols. For example, Bluetooth technology utilizes Adaptive Frequency Hopping (AFH) as a frequency division multiplexing (FDM) technique that minimizes channel interference. In AFH, the physical channel is characterized by a pseudo-random hopping, at a rate of 1600 hops-per-second, among 79 1-MHz channels in the Bluetooth piconet. AFH provides a non-collaborative mechanism that may be utilized by a Bluetooth device to avoid frequencies occupied by a spread spectrum system such as a WLAN system. In some instances, the Bluetooth radio may be adapted to modify its hopping pattern based on, for example, frequencies in the ISM spectrum that are not being occupied by other users.

Even when frequency division multiplexing techniques are applied, significant interference may still occur because a strong signal in a separate channel may still act as a blocking signal and may desensitize the radio front-end receiver, that is, increase the receiver's noise floor to the point that the received signal may not be clearly detected. For example, a collocated WLAN radio front-end transmitter generating a 15 dBm signal acts as a strong interferer or blocker to a collocated Bluetooth radio device receiver when the isolation between radio devices is only 10 dB. Similarly, when a Bluetooth radio device is transmitting and a WLAN radio device is receiving, particularly when the Bluetooth radio front-end transmitter is operating as a 20 dBm Class 1 type, the WLAN radio device receiver may be desensitized by the Bluetooth transmission as the isolation between radios is reduced.

Other techniques may be based on collaborative coexistence mechanisms, such as those described in the IEEE 802.15.2—2003 Recommended Practice for Information Technology—Part 15.2: Coexistence of Wireless Personal Area Networks with Other Wireless Devices Operating in the Unlicensed Frequency Bands. For example, these techniques may comprise Medium Access Control (MAC) layer mechanisms or Physical (PHY) layer mechanisms. The MAC layer techniques may comprise, for example, the Alternating Wireless Medium Access (AWMA) technique or the Packet Traffic Arbitration (PTA) technique. Both the AWMA and the PTA techniques provide a time division multiplexing (TDM) approach to the collocated radio device isolation problem. For example, the AWMA technique partitions a WLAN communication interval into two segments: one for the WLAN system and one for the WPAN system. Each wireless system is then restricted to transmissions in their allocated time segments. On the other hand, the PTA technique provides for each communication attempt by either a collocated WLAN radio device or a Bluetooth radio device to be submitted for arbitration and approval. The PTA may then deny a communication request that would result in collision or interference. The PHY layer technique may comprise, for example, a programmable notch filter in the WLAN radio device receiver to filter out narrow-band WPAN or Bluetooth interfering signals. These techniques may result in some transmission inefficiencies or in the need of additional hardware features in order to achieve better coexistent operation.

Other collaborative coexistence mechanisms may be based on proprietary technologies. For example, in some instances, firmware in the collocated WLAN radio device may be utilized to poll a status signal in the collocated Bluetooth radio device to determine whether Bluetooth communication is to occur. However, polling the Bluetooth radio device may have to be performed on a fairly constant basis and may detract the WLAN radio device from its own WLAN communication operations. If a polling window is utilized instead, where the polling window may be as long as several hundred microseconds, the WLAN radio device may have adequate time available to poll the BT radio device, which may indicate that BT communication is to occur. In other instances, the collocated WLAN and Bluetooth radio devices may utilize an interrupt-driven arbitration approach. In this regard, considerable processing time may be necessary for handling the interrupt operation and to determine the appropriate communication schedule based on the priority and type of WLAN and Bluetooth packets.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method is provided for dynamically changing poll timing based on Bluetooth activity, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for dynamically changing poll timing based on Bluetooth activity. Aspects of the method may comprise determining synchronous Bluetooth activity between a Bluetooth master device and at least one Bluetooth slave device. The synchronous Bluetooth activity may comprise, for example, transmission of packets by the Bluetooth master device via a SCO link and/or a eSCO link. The Bluetooth master device may dynamically adjust a polling period based on the synchronous Bluetooth activity. For example, the polling period may be less when there is synchronous activity than when there is no synchronous activity. The polling periods for when there is synchronous activity and when there is no synchronous activity may be default values. The default polling periods may be changed to different values, for example, by the user.

Figure 1A:
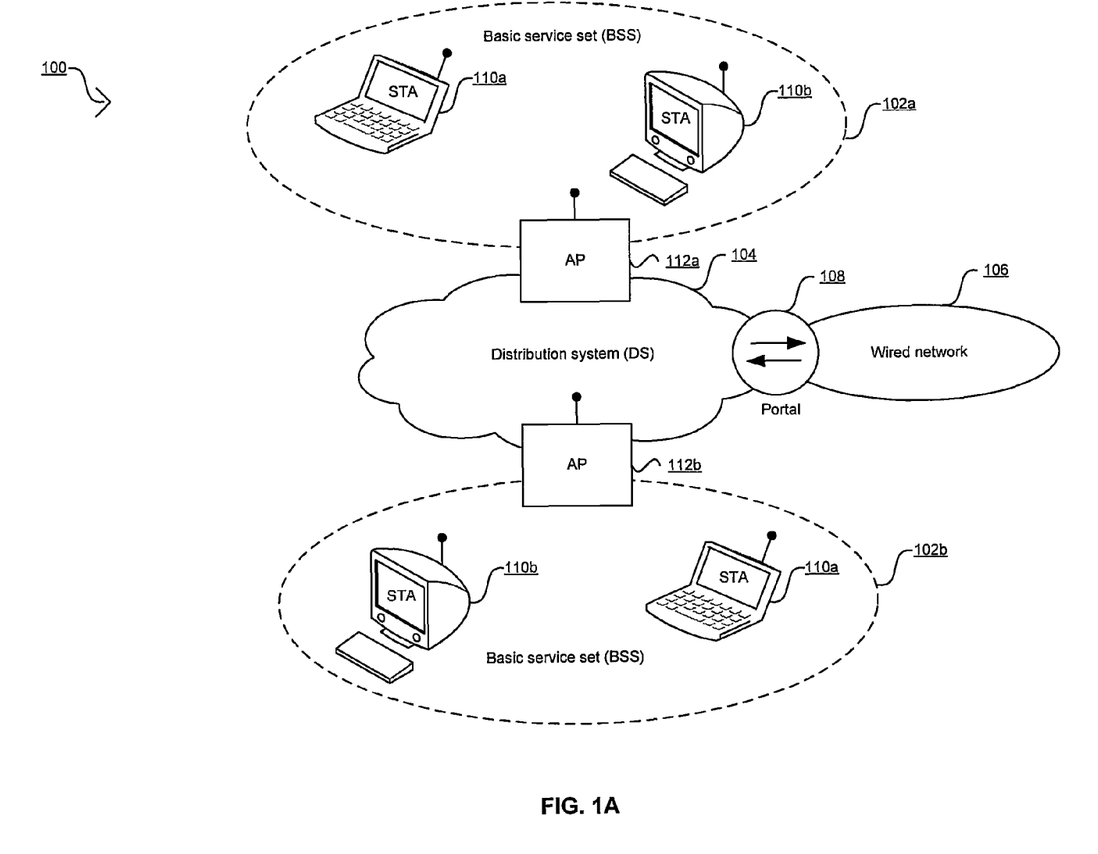
FIG. 1A is a block diagram of an exemplary WLAN infrastructure network comprising basic service sets (BSSs) integrated using a common distribution system (DS), in connection with an embodiment of the invention.

FIG. 1A is a block diagram of an exemplary WLAN infrastructure network comprising basic service sets (BSSs) integrated using a common distribution system (DS), in connection with an embodiment of the invention. Referring to FIG. 1A, the exemplary WLAN infrastructure network 100 shown may comprise a first BSS 102a, a second BSS 102b, a DS 104, a wired network 106, a portal 108, a first access point (AP) 112a, a second AP 112b, and a plurality of WLAN stations (STAs) 110a and 110b. The BSSs 102a and 102b may represent a fundamental building block of the IEEE 802.11 (WLAN) architecture and may be defined as a group of stations (STAs) that are under the direct control of a single coordination function. The geographical area covered by a BSS is known as the basic service area (BSA). The DS 104 may be utilized to integrate the BSSs 102a and 102b and may comprise suitable hardware, logic, circuitry, and/or code that may be adapted to operate as a backbone network that is responsible for Medium Access Control (MAC) level transport in the WLAN infrastructure network 100. The DS 104, as specified by the IEEE 802.11 standard, is implementation independent. For example, the DS 104 may be implemented utilizing IEEE 802.3 Ethernet Local Area Network (LAN), IEEE 802.4 token bus LAN, IEEE 802.5 token ring LAN, Fiber Distributed Data Interface (FDDI) Metropolitan Area Network (MAN), or another IEEE 802.11 wireless medium. The DS 104 may be implemented utilizing the same physical medium as either the first BSS 102a or the second BSS 102b. However, the DS 104 is logically different from the BSSs and may be utilized only to transfer packets between the BSSs and/or to transfer packets between the BSSs and the wired network 106.

The wired network 106 may comprise suitable hardware, logic, circuitry, and/or code that may be adapted to provide wired networking operations. The wired network 106 may be accessed from the WLAN infrastructure network 100 via the portal 108. The portal 108 may comprise suitable hardware, logic, circuitry, and/or code and may be adapted to integrate the WLAN infrastructure network 100 with non-IEEE 802.11 networks. Moreover, the portal 108 may also be adapted to perform the functional operations of a bridge, such as range extension and/or translation between different frame formats, in order to integrate the WLAN infrastructure network 100 with IEEE 802.11-based networks.

The APs 112a and 112b may comprise suitable hardware, logic, circuitry, and/or code that may be adapted to support range extension of the WLAN infrastructure network 100 by providing the integration points necessary for network connectivity between the BSSs. The STA 110a and the STA 110b correspond to WLAN-enabled terminals that comprise suitable hardware, logic, circuitry, and/or code that may be adapted to provide connectivity to the WLAN infrastructure network 100 via the APs. The STA 110a shown is a laptop computer and may correspond to a mobile station or terminal within the BSS and the STA 110b shown is a desktop computer and may correspond to a fixed or stationary terminal within the BSS. Each BSS may comprise a plurality of mobile or fixed stations and may not be limited to the exemplary implementation shown in FIG. 1A.

Figure 1B:
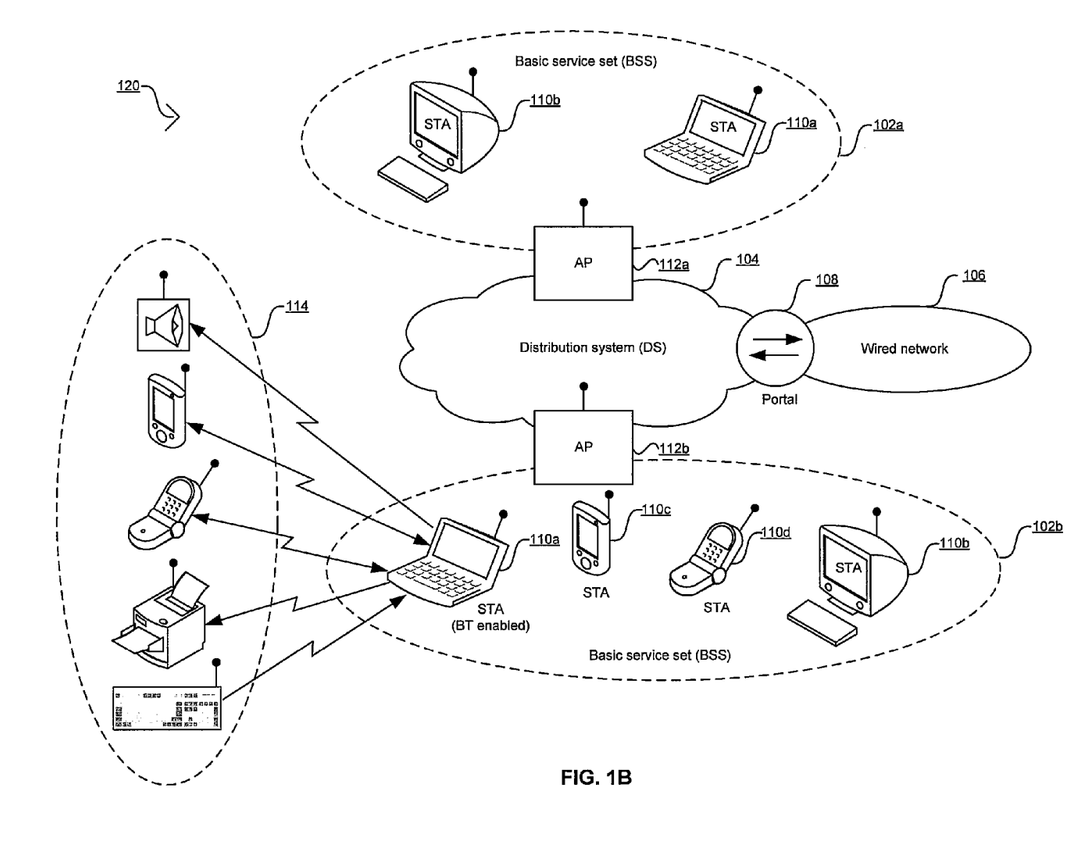
FIG. 1B is a block diagram of an exemplary WLAN infrastructure network comprising a basic service set (BSS) with stations that support WLAN/Bluetooth coexistence, in connection with an embodiment of the invention.

FIG. 1B is a block diagram of an exemplary WLAN infrastructure network comprising a basic service set (BSS) with stations that support WLAN/Bluetooth coexistence, in connection with an embodiment of the invention. Referring to FIG. 1B, the exemplary WLAN infrastructure network 120 shown differs from the WLAN infrastructure network 100 in FIG. 1A in that at least one BSS comprises at least one station or terminal that supports Bluetooth technology. In this regard, the second BSS 102b comprises additional mobile terminals or stations such as a Personal Digital Assistant (PDA) 110c and a mobile phone 110d while the laptop computer 110a is now shown to be Bluetooth-enabled. The peripheral devices 114 shown may be part of the Wireless Personal Area Network (WPAN) supported by the Bluetooth-enabled laptop computer. For example, the laptop computer 110a may communicate via Bluetooth technology with a keyboard, a mouse, a printer, a mobile phone, a PDA, and/or a set of headphones or speakers, where these devices and the laptop computer 110a may form an ad-hoc Bluetooth piconet. Generally, a Bluetooth piconet may comprise a master device or terminal and up to seven slave devices or terminals. In this exemplary implementation, the laptop computer 110a may correspond to the master Bluetooth terminal and the peripheral devices 114 may correspond to the slave Bluetooth terminals.

The Bluetooth-enabled laptop computer 110a in FIG. 1B may comprise a WLAN radio device and a Bluetooth radio device that allows it to communicate with the WLAN infrastructure network 100 via the AP 112b and with the Bluetooth piconet respectively. Because of the size of the laptop computer 110a, locating the WLAN and BT radio devices in the same terminal may result in signal interference between WLAN and BT communications. When the PDA 110c and/or the mobile phone 110d are Bluetooth-enabled, the small form factor of these coexistence terminals may result in a small radio frequency (RF) path loss between WLAN and BT radio devices and likely interference between WLAN and BT communications.

Figure 1C:
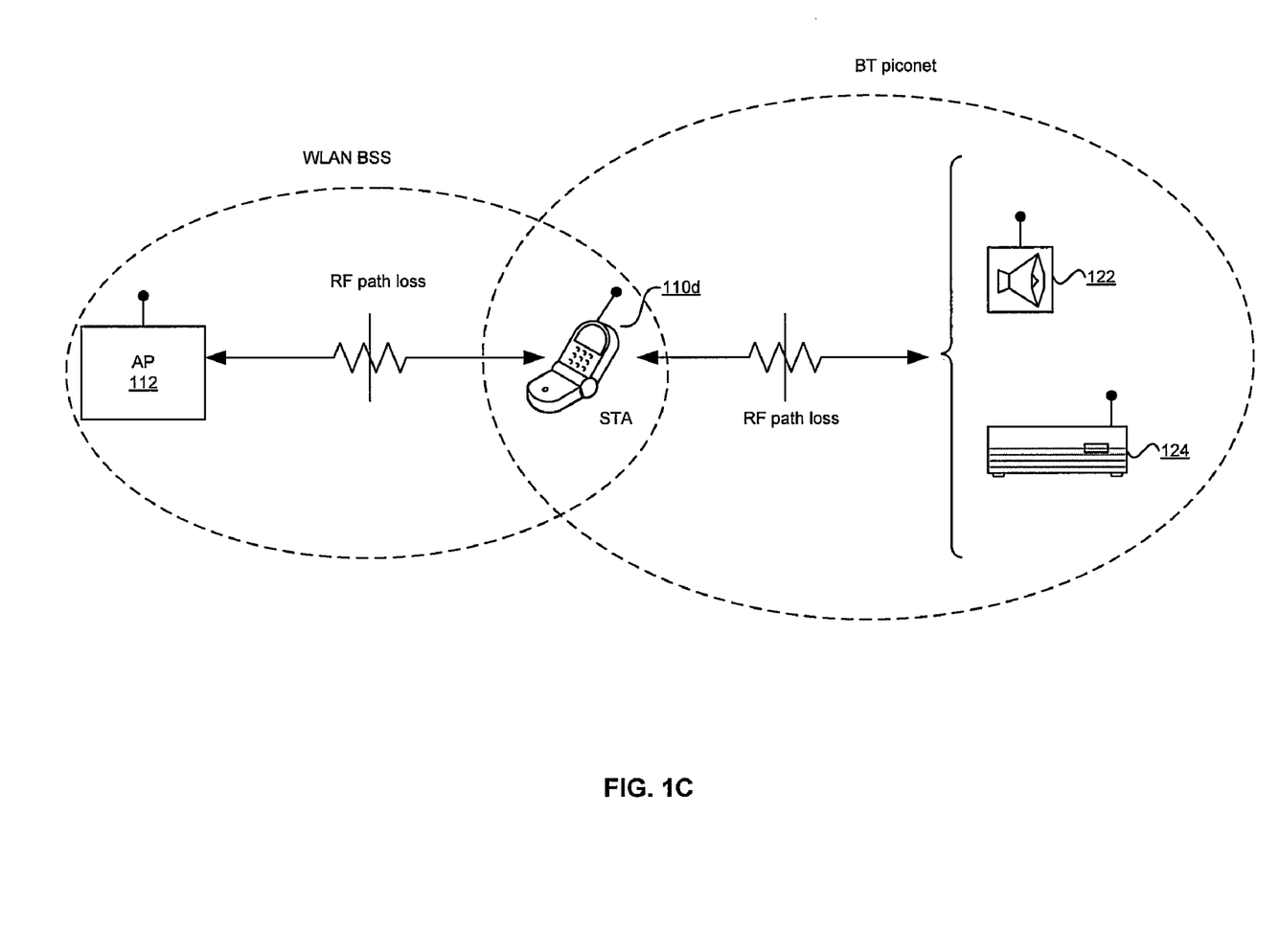
FIG. 1C is a block diagram that illustrates an exemplary usage model for a coexistence terminal with collocated WLAN and Bluetooth radio devices, in connection with an embodiment of the invention.

FIG. 1C is a block diagram that illustrates an exemplary usage model for a coexistence terminal with collocated WLAN and Bluetooth radio devices, in connection with an embodiment of the invention. Referring to FIG. 1C, the mobile phone 110d may comprise a WLAN radio device to communicate with the AP 112. The mobile phone 110d may also be Bluetooth-enabled and may comprise a Bluetooth radio device to communicate with, for example, a Bluetooth headset 122 and/or a home gateway 124 with Bluetooth cordless telephony capability. Due to the small form factor of the mobile phone 110d, the WLAN and Bluetooth radio devices may be in such close proximity to each other within the same coexistence terminal that the isolation between them is sufficiently low to allow desensitization of one radio device by the other's transmissions.

The Bluetooth-enabled mobile phone 110d may comprise two maximum transmission power levels. For example, the mobile phone 110d may operate as a Class 1 power level terminal with a maximum transmission power of 20 dBm to communicate with the home gateway 124. In another example, the mobile phone 110d may operate as a Class 2 power level terminal with a maximum transmission power of 4 dBm to communicate with the Bluetooth headset 122. The Bluetooth headset 122 may comprise suitable hardware, logic, circuitry, and/or code that may be adapted to receive and/or transmit audio information. For example, the Bluetooth headset 122 may be adapted to receive and/or transmit Continuous Variable Slope Delta (CVSD) modulated voice from the mobile phone 110d or receive A2DP, such as MP3, from the mobile phone 110d. The home gateway 124 may comprise suitable hardware, logic, circuitry, and/or code that may be adapted to receive and/or transmit data and/or audio information. For example, the home gateway 124 may receive and/or transmit 64 kb/s CVSD modulated voice.

In operation, the mobile phone 110d may receive voice or audio content from the WLAN infrastructure network via the AP 112 and may communicate the voice or audio contents to the Bluetooth headset 122 or the voice contents to the home gateway 124. Similarly, the Bluetooth headset 122 the home gateway 124 may communicate voice contents to the Bluetooth-enabled mobile phone 110*d* which in turn may communicate the voice contents to other users through the WLAN infrastructure network.

Figure 1D:
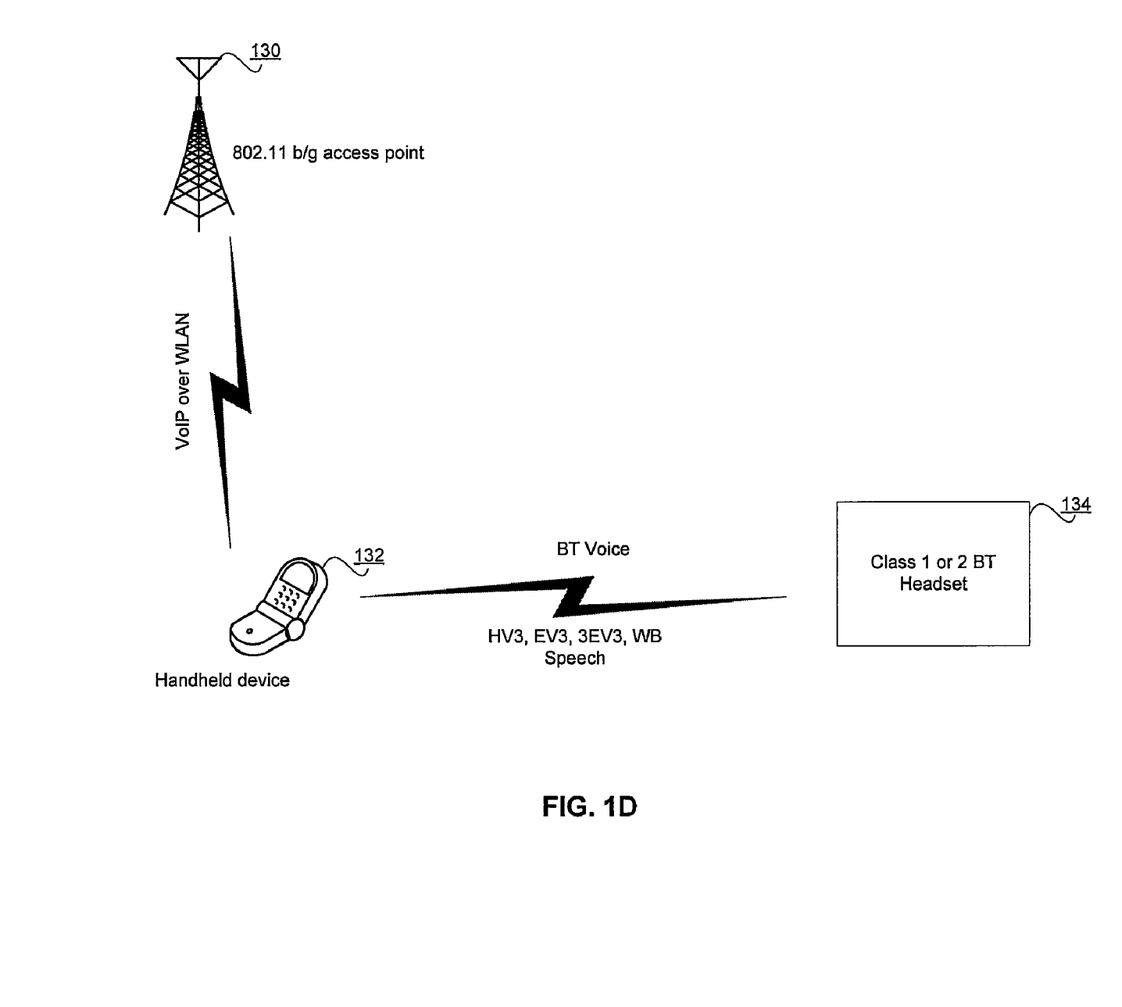
FIG. 1D is a block diagram that illustrates another embodiment of an exemplary usage model for a coexistence terminal with collocated WLAN and Bluetooth radio devices, in connection with an embodiment of the invention.

FIG. 1D is a block diagram that illustrates another embodiment of an exemplary usage model for a coexistence terminal with collocated WLAN and Bluetooth radio devices, in connection with an embodiment of the invention. Referring to FIG. 1D, there is shown an access point (AP) 130, a handheld device, for example, a mobile phone 132 and a Bluetooth headset 134.

The AP 130 may comprise suitable hardware, logic, circuitry, and/or code that may be adapted to support range extension of the WLAN infrastructure network by providing the integration points necessary for network connectivity between the base stations. The mobile phone 132 may comprise a WLAN radio device to communicate with the AP 130. The mobile phone 132 may also be Bluetooth-enabled and may comprise a Bluetooth radio device to communicate with, for example, the Bluetooth headset 134. The Bluetooth headset 134 may comprise suitable hardware, logic, circuitry, and/or code that may be adapted to receive and/or transmit audio information.

The mobile phone 132 may be coupled to the AP 130 via an 802.11 based (WLAN) wireless connection. The mobile phone 132 may be coupled to the Bluetooth headset 134 via a Bluetooth (BT) connection between the mobile phone 132 and the BT headset 134. The WLAN may be adapted to carry voice traffic that may be packetized into frames of 5 to 30 milliseconds (ms) of voice, for example. These packetized frames may be encapsulated into standard real-time transport protocol (RTP) packets. The data packets may be transmitted over a network and reassembled to create a synchronous voice stream. The BT interface may be adapted to carry voice traffic with packetized frames, but the data may be processed as a synchronous pulse coded modulated (PCM) stream by the voice processor.

The mobile phone 132 may comprise suitable hardware, logic, circuitry, and/or code that may be adapted to interface the voice processor and the Bluetooth controller. Command and control data may be passed through a serial interface known as a host controller interface (HCI). The HCI is, for example, a universal serial bus (USB) or a universal asynchronous receiver/transmitter (UART) interface. Voice data may be communicated either through a PCM interface or through the HCI. The PCM interface may include passing voice samples using four pins, for example, a clock pin, a frame synchronization pin, an input data pin and an output data pin. The voice data may be sampled at 8 kHz at 12 to 16 bits per sample, for example. Each sample may be clocked in/out on the PCM interface one bit at a time once every 125 microseconds, for example. In a two-wire coexistence interface, one wire may be an output from a BT controller and the other may be an input. These wires may indicate when each radio is transmitting.

U.S. application Ser. No. 11/143,559 filed Jun. 2, 2005 and U.S. application Ser. No. 11/143,378 filed Jun. 2, 2005, provide a detailed description of a two-wire coexistence interface, and are hereby incorporated by reference in their entirety.

When a user speaks into the BT headset 134 to a remote party, the voice may be sampled by the BT headset 134, converted into mu-law, A-law or CVSD format. After conversion, the voice samples may be packetized into HV3 packets, and transmitted to the mobile phone 132. The BT radio in the mobile phone 134 may be adapted to receive the packetized HV3 packets, which may be processed by the BT controller. The BT controller may be adapted to convert the voice back into uniform samples and transmit the samples to the voice processor using the HCI or PCM interface. The voice processor may be adapted to collect the samples into memory and encode the samples once every frame period, for example. The length of the frame period may depend on the type of voice compression, for example, 5 to 30 ms. After the voice compression, the samples may be packetized into RTP packets and transmitted to the WLAN processor over a serial interface, for example. The voice data may be transmitted to the AP 130. The AP 130 may be adapted to route the voice data to its destination device, which may be another wired or wireless Internet protocol (IP) phone, or a voice-over-IP (VoIP) to public switched telephone network (PSTN) gateway.

When a remote party is talking to a listener on the BT headset 134, the RTP packets may be transmitted from the AP 130 to the mobile phone 132. The WLAN processor in the mobile phone 132 may be adapted to receive the RTP packets from the AP 130. The received RTP packets may be processed by the voice processor in the mobile phone 132. The received packets may be buffered and dejittered, and the voice data may be de-compressed. The voice may be converted to uniform samples, which may be passed via the PCM or HCI interface at 8 kHz, for example, to the BT processor. The BT processor may enable encoding of the voice samples from mu-law, A-law or CVSD into voice data. The voice data may be packetized and transmitted as HV3 packets to the BT headset 134. The BT headset 134 may be adapted to receive the packets, convert the voice to uniform samples and play them out the speaker.

The mobile phone 132 may comprise suitable logic and/or code that may be adapted to communicate with the BT controller. At the lowest level, software may be utilized to control the UART and control lines such as the reset line to the BT controller and power control lines. Software may be utilized to communicate with the BT controller by allowing BT profiles to be implemented such as the headset profile. The BT controller may be adapted to communicate with the lower level software through abstraction layers such as the operating system (OS) independent kernel interface, for example. Application code may be utilized to control the headset provided by the headset profile.

In an embodiment of the invention, the application code may be adapted to translate commands from the user interface into application program interface (API) calls to enable the headset profile, pair the headset, establish or break a synchronous connection oriented (SCO) connection to the headset, and to change the volume of the headset. The application code may be adapted to communicate back events from the BT controller, such as success or failure at setting up the SCO connection. In an embodiment of the invention, the voice processing software may be adapted to determine where to send and receive its voice samples based on whether or not the BT headset 134 is in use. For example, the samples may be routed to the PCM interface when BT headset 134 is in use, and to an internal audio block otherwise.

Figure 2:
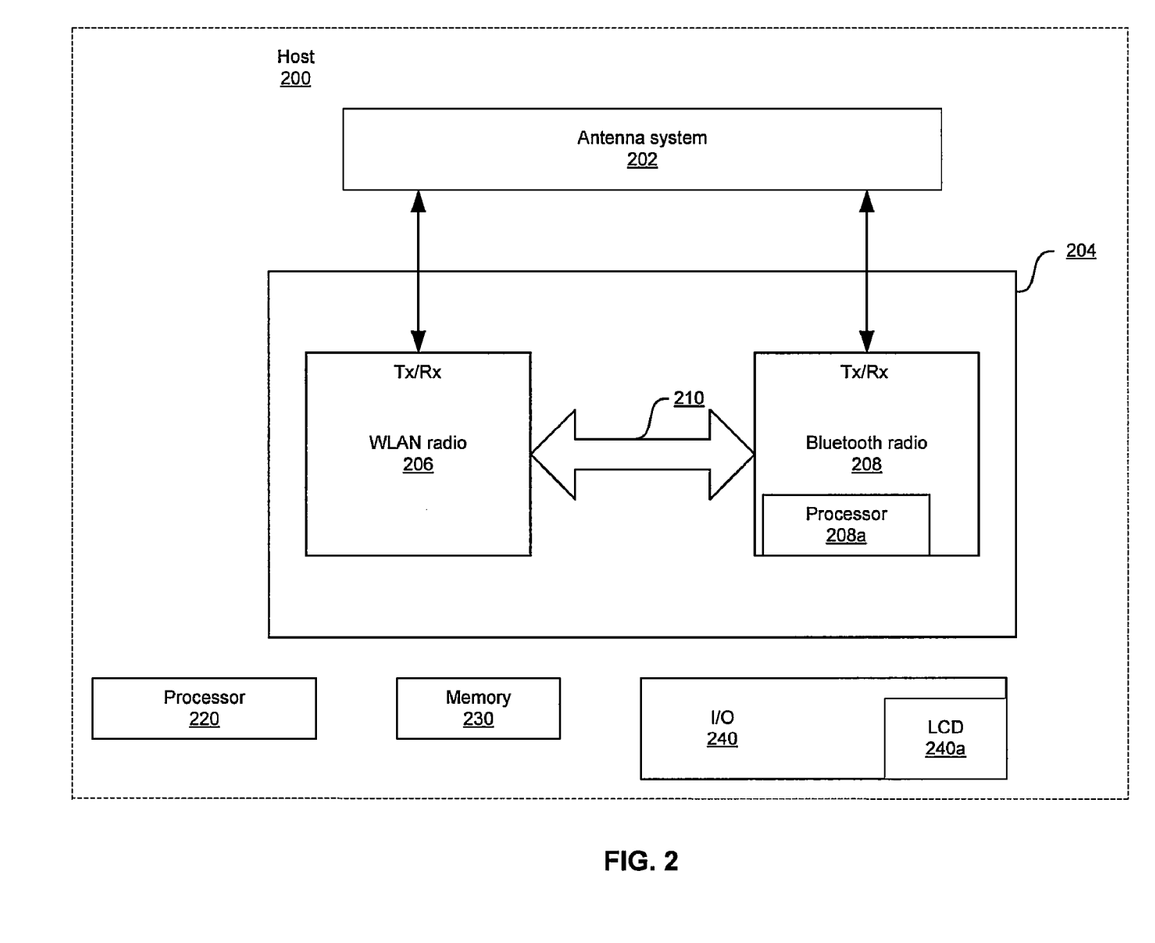
FIG. 2 is a block diagram that illustrates an exemplary circuitry that supports WLAN and Bluetooth radio operations, in connection with an embodiment of the invention.

FIG. 2 is a block diagram that illustrates an exemplary circuitry that supports WLAN and Bluetooth radio operations, in connection with an embodiment of the invention. Referring to FIG. 2, there is shown a host device 200 that may comprise a WLAN/Bluetooth coexistence antenna system 202, a WLAN/Bluetooth (WLAN/BT) radio device 204, a processor 220, memory 230, and I/O 240. The WLAN/BT radio device 204 may comprise a WLAN radio portion 206 and a Bluetooth radio portion 208, where the Bluetooth radio portion 208 may, for example, comprise a processor 208a. The WLAN/BT radio device 204 may be implemented, for example, in one or more chips for a system.

The WLAN/Bluetooth coexistence antenna system 202 may comprise suitable hardware, logic, and/or circuitry that may be adapted to provide WLAN and Bluetooth communication between external devices and a coexistence terminal. The WLAN/Bluetooth coexistence antenna system 202 may comprise at least one antenna for transmission and/or reception of WLAN and Bluetooth packet traffic.

The WLAN radio portion 206 may comprise suitable logic, circuitry, and/or code that may be adapted to process WLAN protocol packets for communication. The WLAN radio portion 206 may be adapted to transfer and/or receive WLAN protocol packets and/or information to the WLAN/Bluetooth coexistence antenna system 202 via a single transmit/receive (Tx/Rx) port. In some instances, the transmit port (Tx) may be implemented separately from the receive port (Rx). The WLAN radio portion 206 may also be adapted to generate signals that control at least a portion of the operation of the WLAN/Bluetooth coexistence antenna system 202. Firmware operating in the WLAN radio portion 206 may be utilized to schedule and/or control WLAN packet communication, for example.

The WLAN radio portion 206 may also be adapted to receive and/or transmit priority signals 210. The priority signals 210 may be utilized to schedule and/or control the collaborative operation of the WLAN radio portion 206 and the Bluetooth radio portion 208. In this regard, the priority signals 210 may comprise a plurality of signals to implement various levels of transmission priority. For example, a single signal implementation may result in two transmission priority levels, a two-signal implementation may result in up to four different transmission priority levels, and a three-signal implementation may result in up to eight different transmission priority levels.

The Bluetooth radio portion 208 may comprise suitable logic, circuitry, and/or code that may be adapted to process Bluetooth protocol packets for communication. The Bluetooth radio portion 208 may be adapted to transfer and/or receive Bluetooth protocol packets and/or information to the WLAN/Bluetooth coexistence antenna system 202 via a single transmit/receive (Tx/Rx) port. In some instances, the transmit port (Tx) may be implemented separately from the receive port (Rx). The Bluetooth radio portion 208 may also be adapted to generate signals that control at least a portion of the operation of the WLAN/Bluetooth coexistence antenna system 202. Firmware operating in the Bluetooth radio portion 208 may be utilized to schedule and/or control Bluetooth packet communication. The processor 208a may, for example, use the firmware during operation of the Bluetooth radio portion 208. The Bluetooth radio portion 208 may also be adapted to receive and/or transmit priority signals 210. A portion of the operations supported by the WLAN radio portion 206 and a portion of the operations supported by the Bluetooth radio portion 208 may be performed by common logic, circuitry, and/or code.

The processor 220 may comprise suitable logic, circuitry and/or code that may enable communication of data, command and/or status with the Bluetooth radio portion 208 and/or the WLAN radio portion 206. The memory 230 may comprise suitable logic and/or circuitry that may enable storage of information, such as, for example, data and/or code, that may be used for operation of the host device 200.

The I/O 240 may comprise, for example, input devices such as alpha-numeric buttons, and output video display. For example, the output video display may be a LCD screen 240a. The LCD screen 240a may display, for example, quality of service options that may be chosen by a user. The quality of service options may comprise various parameters that may affect communication via the WLAN radio 206 and the Bluetooth radio 208.

In some instances, at least a portion of either the WLAN radio portion 206 or the Bluetooth radio portion 208 may be disabled and the wireless terminal may operate in a single-communication mode, that is, coexistence may be disabled. When at least a portion of the WLAN radio portion 206 is disabled, the WLAN/Bluetooth coexistence antenna system 202 may utilize a default configuration to support Bluetooth communication. When at least a portion of the Bluetooth radio portion 208 is disabled, the WLAN/Bluetooth coexistence antenna system 202 may utilize a default configuration to support WLAN communication.

Packet communication between the WLAN/Bluetooth coexistence antenna system 202 and the WLAN/Bluetooth (WLAN/BT) radio device 204 may take place via a radio front-end topology in the WLAN/Bluetooth (WLAN/BT) radio device 204. The radio front-end topology may be implemented partially in the WLAN radio portion 206 and/or partially in the Bluetooth radio portion 208, for example.

Figure 3:
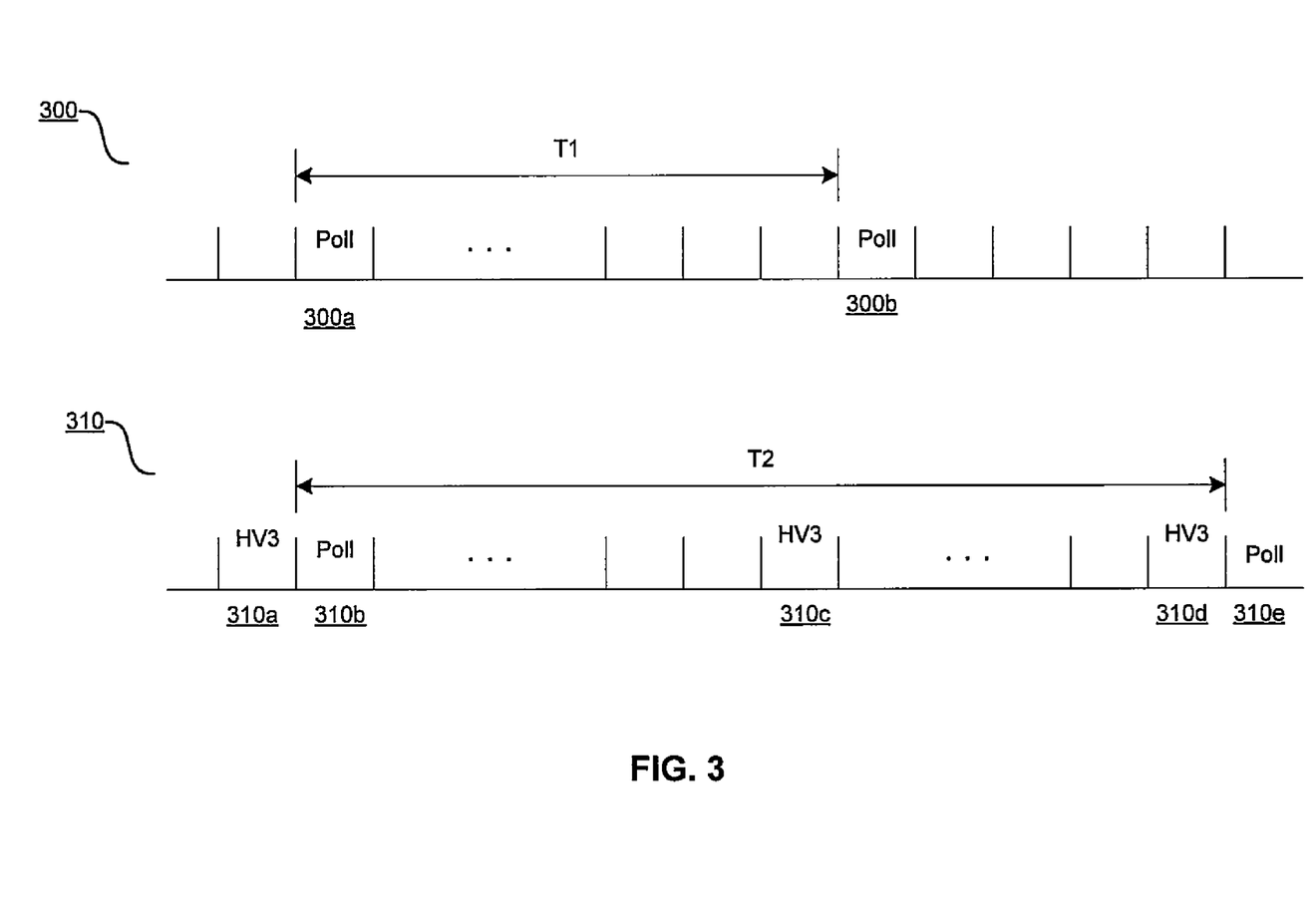
FIG. 3 is a block diagram illustrating dynamic changing of poll timing, in accordance with an embodiment of the invention.

FIG. 3 is a block diagram illustrating dynamic changing of poll timing, in accordance with an embodiment of the invention. Referring to FIG. 3, there is shown the timelines 300 and 310 where time may increase from left to right. With respect to the timeline 300, there is shown Tpoll packets 300a and 300b, where the period of time between the Tpoll packets may be a polling period T1. A master Bluetooth device, such as, for example, the STAs 110a, 110b, 110c, and/or 110d, may transmit poll packets Tpoll to a slave Bluetooth device, such as, for example, one of the peripheral devices 114. The slave Bluetooth device may then respond by sending a packet to the master Bluetooth device, since a slave Bluetooth device may transmit to the master Bluetooth device only in response to a packet from the master Bluetooth device.

The Tpoll packet may be transmitted to the slave Bluetooth device if the master Bluetooth device does not have any packets to send to the slave Bluetooth device. This may allow the slave Bluetooth device clock to stay synchronized to the master Bluetooth device clock for communication purposes. The polling period T1 may be design and/or implementation dependent. For example, the poll packet Tpoll may be transmitted to each Bluetooth slave device every 25 to 40 ms. Accordingly, the polling period T1 may be set to a period between, for example, 25 ms and 40 ms.

With respect to the timeline 310, there is shown Tpoll packets 310b and 310e. There is also shown SCO packets 310a, 310c, ..., 310d. The SCO packets 310a, 310c, ..., 310d may be, for example, for a voice call. The SCO packets may be sent by a Bluetooth device at least once every six time slots. For example, the Bluetooth standard allows a SCO link to use two slots for a SCO frame, 4 slots for a SCO frame, or 6 slots for a SCO frame. There may be, then, a maximum of 3 SCO links for a Bluetooth device. Therefore, since a time period of each slot may be 625 microseconds (µs), a SCO frame may be received at least every 3.75 ms by a Bluetooth device. Since the SCO frames may be used for clock synchronization, the Tpoll packets may not need to be sent at every polling period T1 for synchronization.

Accordingly, the polling period may be increased from T1 to T2 depending on Bluetooth activity, where the polling period T2 may be design and/or implementation dependent.

The increased polling period may reduce the number of Tpoll packets, and thus provide less interference to another communication network that may be using the frequency spectrum used by the Bluetooth devices. For example, collocated WiFi devices may benefit from the reduced Bluetooth transmission of Tpoll packets. When a SCO link is removed for a Bluetooth master device, the Bluetooth master device may reduce the polling period from T2 to T1, or to another desired polling period. The poll timing of a Bluetooth master device may be dynamically changed based on Bluetooth activity While embodiments of the invention may have been described using SCO connections, the invention need not be so limited. For example, extended SCO (eSCO) links may also use similar dynamic adjustment of the Tpoll periods to reduce interference to other communication devices using a common frequency spectrum as the Bluetooth devices.

The eSCO logical transport is a symmetric or asymmetric, point-to-point link between the master and a specific slave. The eSCO reserves slots on the physical channel and may therefore be considered as a circuit-switched connection between the master and the slave. The eSCO links may offer a number of extensions over the standard SCO links, in that they support a more flexible combination of packet types and selectable data contents in the packets and selectable slot periods, allowing a range of synchronous bit rates to be supported. An eSCO links may also offer limited retransmission of packets, unlike SCO links where there is no retransmission. If retransmissions are required, they may take place in the slots that follow the reserved slots, otherwise the slots may be used for other traffic, for example.

An eSCO packet may comprise a cyclic redundancy check (CRC) code and retransmission may be applied when no acknowledgement of proper reception is received in the reserved timeslot. The eSCO packet may be utilized for 64 kb/s audio transmission, transparent data transmission at 64 kbs/s, and/or for other transmission rates, for example. The Bluetooth protocol specifies an EV3 packet as one implementation of an eSCO packet that may comprise between 1 and 30 information bytes and a 16-bit CRC code.

A Bluetooth device, for example, the Bluetooth radio portion 208, may be collocated with a WLAN device, for example, WLAN radio portion 206. When the Bluetooth radio portion 208 has a SCO or eSCO link with another Bluetooth device, a coexistence algorithm may allocate a high priority to the SCO or eSCO frames. The coexistence algorithm may also allocate a high priority to Tpoll frames. Accordingly, the SCO/eSCO frames and the Tpoll frames may reduce the bandwidth for the WLAN radio portion 206. However, by increasing the time between Tpoll frames, the WLAN radio portion 206 may effectively have a greater bandwidth.

The time between Tpoll frames may be set dynamically, for example, by the Bluetooth master device when a SCO/eSCO link is set up. This is described in more detail with respect to FIG. 4. The time between Tpoll frames may also be changed by a HCI command, which may be, for example, a vendor specific command, or by setting of a quality of service parameter via a host. The changing of the quality of service parameter, or issuing of a command via the host may be made by a user, for example. A user may select or input via the I/O 240, for example, one of several allowed times or an allowed time in a range of allowed times between transmission of Tpoll frames. Also, if the user selects via the I/O 240 a quality of service, then the polling period may be set to a period that may be associated with that quality of service. The quality of service may comprise, for example, priority of Bluetooth communication versus WLAN communication.

Figure 4:
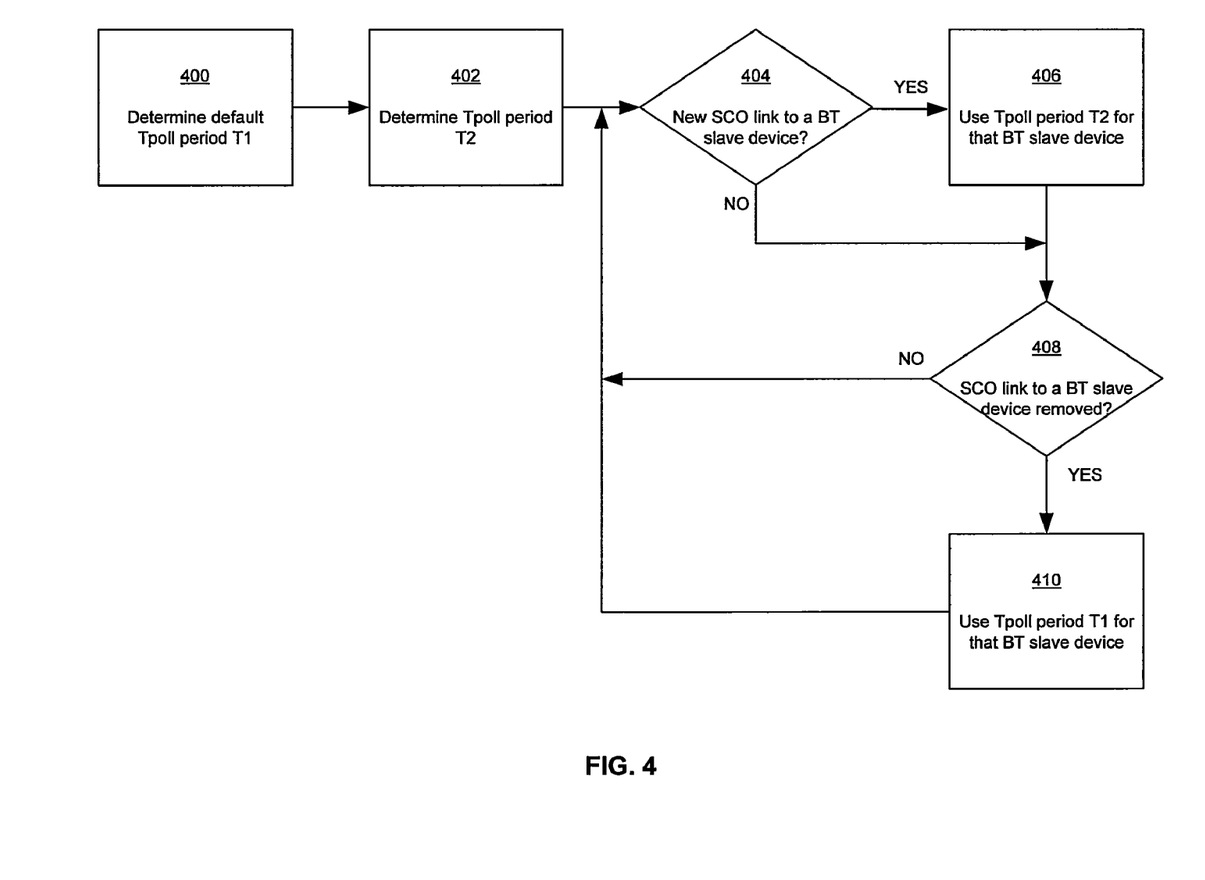
FIG. 4 is exemplary flow diagram for dynamically changing poll timing based on Bluetooth activity, in accordance with an embodiment of the invention.

FIG. 4 is an exemplary flow diagram for dynamically changing poll timing based on Bluetooth activity, in accordance with an embodiment of the invention. Referring to FIG. 4, there is shown steps 400 to 410. In step 400, a default polling period T1 may be selected. The default polling period T1 may be, for example, pre-set during manufacturing of a Bluetooth device and/or of components for the Bluetooth device. The default polling period T1 may also be set to another value by, for example, a user of the Bluetooth device.

In step 402, the increased polling period T2 may be, for example, pre-set during manufacturing of a Bluetooth device and/or of components for the Bluetooth device. The default polling period T2 may also be set to another value by, for example, a user of the Bluetooth device. In step 404, the Bluetooth master device may determine whether there is a SCO link to a Bluetooth slave device. If there is, the next step may be step 406. Otherwise, the next step may be step 408. In step 406, the Bluetooth master device may set the polling period to T2 for the Bluetooth slave device associated with the SCO link determined in step 404. Accordingly, the Bluetooth master device may transmit Tpoll packets to the Bluetooth slave device using to the polling period T2.

In step 408, the Bluetooth master device may determine whether a SCO link to a Bluetooth slave device may have been removed. If so, the next step may be step 410. Otherwise, the next step may be step 404. In step 410, the Bluetooth master device may set the polling period to the default polling period T1 for the Bluetooth slave device associated with the SCO link determined in step 408. Accordingly, the Bluetooth master device may transmit Tpoll packets to the Bluetooth slave device using to the default polling period T1. The next step may be step 404.

In accordance with an embodiment of the invention, aspects of an exemplary system may comprise a Bluetooth master device, such as, for example, the host device 200, that enables determination of synchronous Bluetooth activity between the Bluetooth master device 200 and any Bluetooth slave device, such as, for example, the Bluetooth headset 122. The Bluetooth master device 200 may dynamically adjust a polling period to the Bluetooth slave device based on the presence of the synchronous Bluetooth activity. The synchronous Bluetooth activity may comprise transmission by the Bluetooth master of SCO and/or eSCO packets.

A polling period that may separate transmission of Tpoll packets may be greater when there is synchronous activity than when there is no synchronous activity. The polling periods for when there is synchronous activity and when there is no synchronous may be default values. These default values may also be changed to different values, for example, by a user of the Bluetooth master device 200. This may be, for example, by directly using a HCI command, or indirectly by selecting a quality of service that may have a corresponding polling time period associated with it.

Another embodiment of the invention may provide a machine-readable storage, having stored thereon, a computer program having at least one code section executable by a machine, thereby causing the machine to perform the steps as described above for dynamically changing poll timing based on Bluetooth activity.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for wireless communication, the method comprising:
   determining by a Bluetooth master device, presence of synchronous Bluetooth communication between said Bluetooth master device and at least one Bluetooth slave device; and
   upon determination that said synchronous Bluetooth communication is present, dynamically adjusting a polling period for said at least one Bluetooth slave device from a first determined polling period directly to a second determined polling period.

2. The method according to claim 1, wherein said synchronous Bluetooth communication comprises transmission by said Bluetooth master device of packets via one or both of an SCO link and an eSCO link.

3. The method according to claim 1, wherein said polling period is greater when said synchronous Bluetooth communication is determined to be present than when said synchronous Bluetooth communication is determined not to be present.

4. The method according to claim 1, comprising setting said polling period for said at least one Bluetooth slave device to said first determined polling period when said synchronous Bluetooth communication is determined not to be present between said Bluetooth master device and said Bluetooth slave device.

5. The method according to claim 4, comprising enabling changing a value of said first determined polling period to a different value.

6. The method according to claim 1, comprising enabling changing a value of said second determined polling period to a different value.

7. A machine-readable storage having stored thereon, a computer program having at least one code section for wireless communication, the at least one code section being executable by a machine for causing the machine to perform steps comprising:
   determining by a Bluetooth master device, presence of synchronous Bluetooth communication between said Bluetooth master device and at least one Bluetooth slave device; and
   upon determination that said synchronous Bluetooth communication is present, dynamically adjusting a polling period for said at least one Bluetooth slave device from a first determined polling period directly to a second determined polling period.

8. The machine-readable storage according to claim 7, wherein said synchronous Bluetooth communication comprises transmission by said Bluetooth master device of packets via one or both of an SCO link and an eSCO link.

9. The machine-readable storage according to claim 7, wherein said polling period is greater when said synchronous Bluetooth communication is determined to be present than when said synchronous Bluetooth communication is determined not to be present.

10. The machine-readable storage according to claim 7, wherein the at least one code section comprises code for setting said polling period for said at least one Bluetooth slave device to said first determined polling period when said synchronous Bluetooth communication is determined not to be present between said Bluetooth master device and said Bluetooth slave device.

11. The machine-readable storage according to claim 10, wherein the at least one code section comprises code for enabling changing a value of said first determined polling period to a different value.

12. The machine-readable storage according to claim 7, wherein the at least one code section comprises code for enabling changing a value of said second determined polling period to a different value.

13. A system for wireless communication, the system comprising:
   a Bluetooth master device that enables determination of presence of synchronous Bluetooth communication between said Bluetooth master device and at least one Bluetooth slave device; and
   said Bluetooth master device enables, upon determination that said synchronous Bluetooth communication is present, dynamically adjusting of a polling period for said at least one Bluetooth slave device from a first determined polling period directly to a second determined polling period.

14. The system according to claim 13, wherein said synchronous Bluetooth communication comprises transmission by said Bluetooth master device of packets via one or both of an SCO link and an eSCO link.

15. The system according to claim 13, wherein said polling period is greater when said synchronous Bluetooth communication is determined to be present than when said synchronous Bluetooth communication is determined not to be present.

16. The system according to claim 13, wherein said Bluetooth master device enables setting said polling period for said at least one Bluetooth slave device to said first determined polling period when said synchronous Bluetooth communication is determined not be present between said Bluetooth master device and said Bluetooth slave device.

17. The system according to claim 16, wherein said Bluetooth master device enables setting a value of said first determined polling period to a different value.

18. The system according to claim 13, wherein said Bluetooth master device enables setting a value of said second determined polling period to a different value.

19. The method according to claim 1, comprising:
  determining whether said synchronous Bluetooth communication remains present; and
  upon determination that said synchronous Bluetooth communication is no longer present, dynamically adjusting said polling period for said at least one Bluetooth slave device from said second determined polling period directly to said first determined polling period.

20. The machine-readable storage according to claim 7, wherein the at least one code section comprises code for:
  determining whether said synchronous Bluetooth communication remains present; and
  upon determination that said synchronous Bluetooth communication is no longer present, dynamically adjusting said polling period for said at least one Bluetooth slave device from said second determined polling period directly to said first determined polling period.

21. The system according to claim 13, wherein said Bluetooth master device enables:
  determining whether said synchronous Bluetooth communication remains present; and
  upon determination that said synchronous Bluetooth communication is no longer present, dynamically adjusting said polling period for said at least one Bluetooth slave device from said second determined polling period directly to said first determined polling period.

\* \* \* \* \*